Jan. 8, 1957 F. R. GOLDSCHMIED 2,776,724
ELECTROSTATIC PRECIPITATORS
Filed March 1, 1955 2 Sheets-Sheet 1

INVENTOR.
Fabio R. Goldschmied
BY Robert T. Palmer
Attorney

Jan. 8, 1957 F. R. GOLDSCHMIED 2,776,724
ELECTROSTATIC PRECIPITATORS
Filed March 1, 1955 2 Sheets-Sheet 2

INVENTOR.
Fabio R. Goldschmied
BY
Robert J. Palmer
Attorney

United States Patent Office 2,776,724
Patented Jan. 8, 1957

2,776,724

ELECTROSTATIC PRECIPITATORS

Fabio R. Goldschmied, Quincy, Mass., assignor to Westinghouse Electric Corporation, East Pittsburgh, Pa., a corporation of Pennsylvania Application March 1, 1955, Serial No. 491,285

6 Claims. (Cl. 183—7)

This invention relates to electrostatic precipitators for removing small foreign particles such as dust from gases such as air.

Conventional electrostatic precipitators used for cleaning air have fixed collector plates between which the gas to be cleaned is moved by separate fans within the precipitator casings or connected by ducts to the casings.

This invention uses the collector plates of an electrostatic precipitator as a fan rotor, the plates being rotated by an electric motor, and acting as friction discs, the adhesion of the air to the discs, and centrifugal force, causing the air to move through the precipitator. Not only is the usual fan eliminated, but the rotary plates act as agglomerators, the agglomerated particles being thrown off by centrifugal force into an annular filter.

An object of this invention is to use the collector plates of an electrostatic precipitator as friction discs of a fan rotor for moving the air to be cleaned through the precipitator.

This invention will now be described with reference to the annexed drawings, of which:

Figure 1:
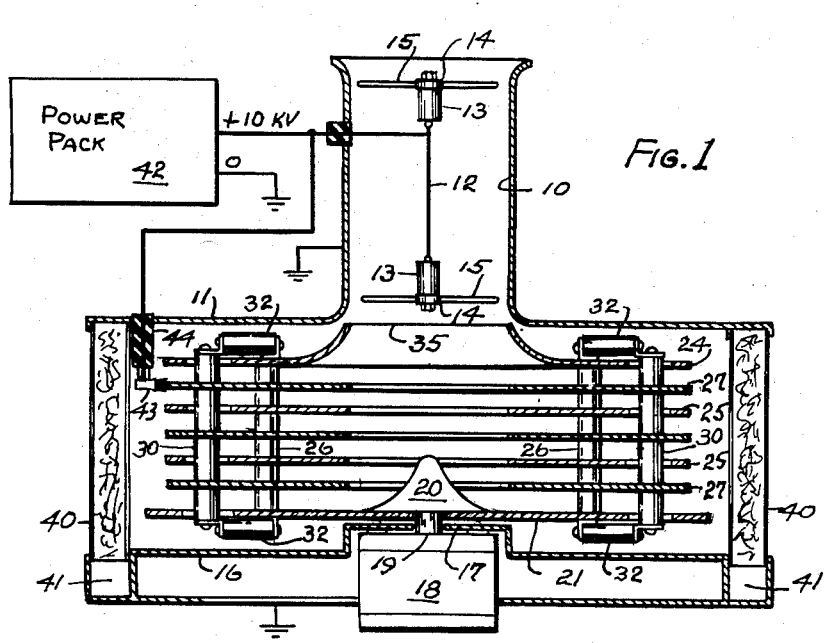
Fig. 1 is a side section of an electrostatic precipitator embodying this invention, the section being taken along the line 1—1 of Fig. 2.
Figure 2:
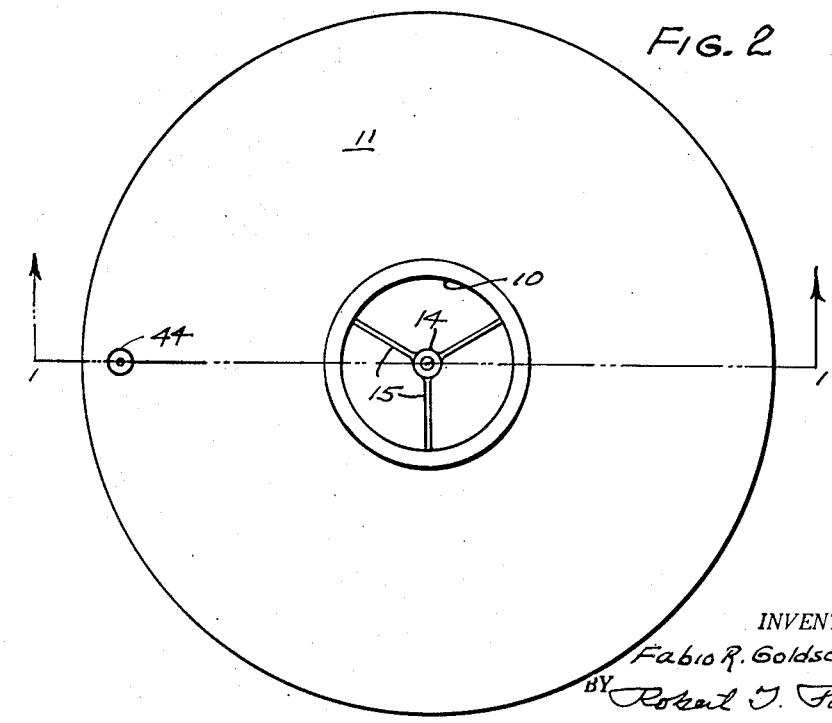
Fig. 2 is a plan view of the precipitator looking into its air inlet side.
Figure 3:
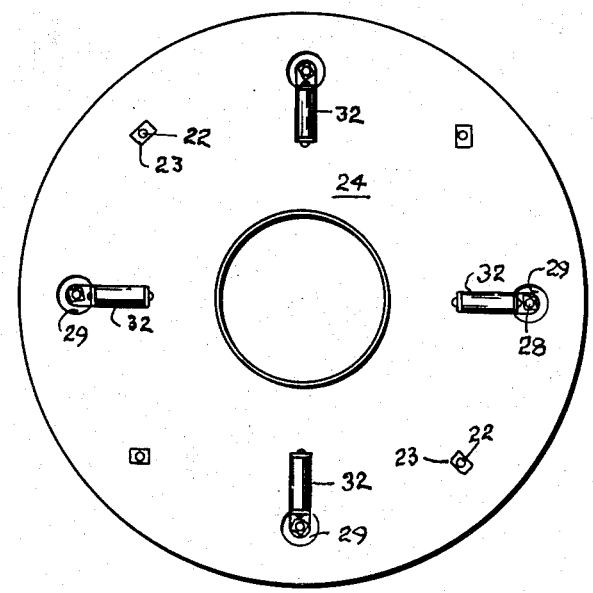
Fig. 3 is a plan view looking at the top of the collector cell.
Figure 4:
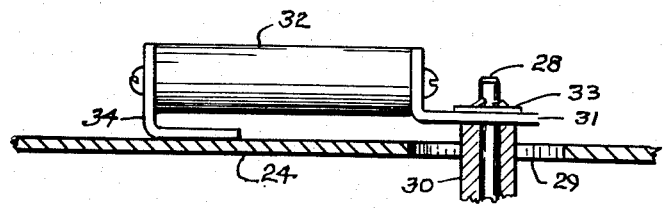
Fig. 4 is an enlarged detail of one of the insulating supports for the charged plates of the collector cell.
Figure 5:
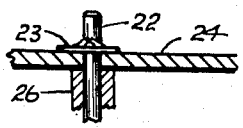
Fig. 5 is an enlarged detail of one of the supports of the grounded plates of the collector cell.

The precipitator illustrated by the drawings has a grounded, metal ionizer electrode 10 formed as a vertically extending cylinder attached to or formed as a part of a horizontally extending, annular metal sheet 11. An ionizer wire 12 extends along the axis of the electrode 10, and is attached at its ends to the inner ends of cylindrical insulators 13. The outer ends of the insulators are attached to supports 14 which have horizontally extending arms 15 attached to the inner surface of the electrode 10.

Spaced below the sheet 11 is a metal sheet 16 having a raised inner portion 17 to which is attached on electric motor 18. The motor 18 has a rotary shaft 19 with a hub 20 thereon to which a circular, lower end plate 21 of sheet metal is attached. Tie rods 22 extend vertically through the plate 21 and have friction fasteners 23 around their lower ends in contact with the lower surface of the plate 21. The upper ends of the tie rods extend through an annular, upper end plate 24 of sheet metal.

Grounded, annular collector plates 25 of sheet metal are supported on the tie rods 22 between the end plates 21 and 24, and are spaced apart and held in position by cylindrical metal spacers 26 around the tie rods 22.

Charged, annular collector plates 27 of sheet metal are supported on the tie rods 28 which extend through clearance openings 29 in the end plates 21 and 24, and through similar clearance openings in the grounded plates 25. Cylindrical, metal spacers 30 extend around the rods 28 between the plates 27 in contact therewith. The spacers 30 extend through clearance openings in the grounded plates 25. The ends of the tie rods 28 extend through horizontally extending portions of the structural angles 31 which have vertically extending portions to which the outer ends of the cylindrical insulators 32 are attached. Friction fasteners 33 extend around the ends of the tie rods 28 in contact with the outer surfaces of the horizontal portions of the angles 31, and clamp the latter against the adjacent spacers 30. The inner ends of the insulators 32 are attached to the vertically extending portions of the structural angles 34, the horizontally extending portions of which are attached to the end plates 21 and 24.

The upper end plate 21 has an upwardly extending inner portion around a central opening 35 which is aligned with the interior of the cylindrical ionizer electrode 10, and which forms a stream-lined inlet into the collector cell. The collector plates 25 and 27 have central openings aligned with the opening 35. The lower end plate 24 has no such opening since it serves as the back plate of a fan rotor as well as the bottom collector plate of the collector cell.

An annular filter 40 of the glass or metal wool type extends around the circular collector plates of the collector cell concentric therewith, and has an annular sump 41 therebelow for receiving liquid droplets which drain from the filter when the precipitator is used for collecting oil or other vapors.

The ionizer wire 12 is connected to the positive terminal of a conventional power pack 42, the negative terminal of which is grounded. The charged collector plates 27 are connected to the positive terminal of the power pack through a brush 43 which contacts the outer portion of the uppermost of the charged plates 27, and which is supported by an insulator 44 from the upper sheet 11.

Operation

In operation, upon rotation of the collector plates by the motor 18, the fluid boundary layer adhering to the surfaces of the plates will be moved outwardly by centrifugal force, the air between the plates being caused to move outwardly by the viscous shearing stresses, the outwardly moving air being replaced by air drawn in through the cylindrical ionizer electrode 10 as is usual in fan action.

The air drawn in through the cylindrical ionizer electrode around the ionizer wire 12 is ionized so that foreign particles entrained in the air are given positive electrostatic charges, causing them to be moved by the electrostatic fields existing between the charged and grounded plates against the grounded plates. Due to centrifugal force the charged particles move outwardly along the plate surfaces, contacting other particles and forming agglomerates which are thrown outwardly by centrifugal force into the filter 40.

When the precipitator is used for removing oil or other vapors from air, the liquid droplets thrown out into the filter 40 would drain by gravity into the sump 41.

When the precipitator is used for removing dust from air, the filter 40 could be removed after it has become loaded with dust, and replaced after washing, or could be replaced with a new one.

While one embodiment of this invention has been described for the purpose of illustration, it should be understood that the invention is not limited to the exact apparatus and arrangement of apparatus illustrated, since

What is claimed is:

1. An electrostatic precipitator comprising a plurality of circular, spaced-apart, parallel collector plates, an electric motor having a shaft for rotating said plates, means for attaching an end one of said plates to said shaft, means for insulatedly supporting alternate of said plates from said one end plate, means supporting the others of said plates directly from said one end plate, all of said plates except said one end plate having central openings, an ionizer having an ionizer wire adjacent the opening in the other end plate and having a non-discharging ionizer electrode spaced from said wire, and electric connections for supplying high voltage to said wire and to said alternate plates.

2. An electrostatic precipitator as claimed in claim 1 in which an annular filter of intermeshed filaments is provided around said plates.

3. An electrostatic precipitator as claimed in claim 2 in which a liquid collecting sump is provided under said filter.

4. An electrostatic precipitator as claimed in claim 1 in which the non-discharging ionizer electrode is a metal cylinder having its axis aligned with the axis of said shaft, and in which the ionizer wire is supported within said cylinder longitudinally thereof.

5. An electrostatic precipitator as claimed in claim 4 in which an annular filter of intermeshed filaments is provided around the plates.

6. An electrostatic precipitator as claimed in claim 5 in which a liquid receiving sump is provided below said filter.

References Cited in the file of this patent

UNITED STATES PATENTS

| | | |
|---|---|---|
| 2,307,603 | Penney | Jan. 5, 1943 |
| 2,524,347 | Gilmore | Oct. 3, 1950 |

FOREIGN PATENTS

| | | |
|---|---|---|
| 617,411 1st. Add. | France (Add. Patent 32,128) | Apr. 26, 1927 |
| 617,411 2nd Add. | France (Add. Patent 32,611) | Sept. 13, 1927 |
| 1,029,116 | France | Mar. 4, 1953 |